Patented Oct. 3, 1950

2,524,384

UNITED STATES PATENT OFFICE 2,524,384

PRODUCTION OF URANIUM TRIIODIDE

John A. Holmes, Stillwater, Okla., assignor to the United States of America as represented by the United States Atomic Energy Commission No Drawing. Application February 12, 1948, Serial No. 7,991

3 Claims. (Cl. 23—14.5)

The present invention relates to a process for producing uranium triiodide and, more particularly, to a process for producing uranium triiodide through the reaction at an elevated temperature of uranium metal with iodine vapor at a relatively low pressure.

It is an object of the invention to provide a simple process for the production of uranium triiodide in relatively pure form and on a substantial scale.

It is a further object of the invention to provide a simple process for producing uranium triiodide directly without the necessity of first isolating intermediate uranium iodides.

It is a further object of the invention to provide an improved process of producing uranium triiodide which employs the reaction of uranium metal and iodine in the vapor state at a relatively low pressure.

My invention, both as to its organization and method of operation, together with further objects and advantages thereof, will best be understood by reference to the following specification.

In the past it has not been found possible to produce uranium triiodide by electrolytic methods usually applicable to other uranium trihalides or by any other convenient reaction on reduced uranium metal.

Now it has been discovered that by reacting uranium metal and iodine vapor at a reaction temperature of about 500° to 530° C. to form $UI_4$ and then passing the $UI_4$ through a lower temperature region while maintaining this region at a relatively low partial pressure of iodine of between $10^{-2}$ to $10^{-4}$ mm. Hg, a simultaneous condensation and shift in equilibrium is effected and uranium triiodide is produced in exceedingly pure form and on a substantial scale.

In carrying out the invention, there is employed apparatus consisting of a copper reactor tube, wound with Nichrome resistance wire, to which is attached a copper condenser tube, also wound with Nichrome resistance wire, the diameter of the reactor tube being approximately four or five times that of the condenser tube. The copper condenser tube communicates with a liquid air trap and a vacuum pumping arrangement capable of producing a vacuum in the system corresponding to an absolute pressure of not greater than about $10^{-5}$ mm. Hg. The windings of resistance wire on the smaller tube are spaced in such manner as to provide, during operation, a gradual temperature gradient varying from about 400° C. near the inlet end of the condenser (the end nearer the reactor tube) to the order of about 200° C. to 250° C. near the far end of the condenser. The heating element on the copper reactor tube is arranged in such manner as to permit bringing the contents thereof to temperatures of the order of 500° to 530° C. The inlet end of the copper reactor tube communicates with an iodine generating chamber containing solid iodine that is adapted to be heated in such manner as to produce iodine vapor at a predetermined rate.

In accordance with the invention, a charge of uranium metal is placed in the copper reactor tube and brought to a reaction temperature of about 500° to 530° C. and a vacuum corresponding to an absolute pressure of not greater than $10^{-5}$ mm. Hg. is maintained. A stream of iodine vapor from the iodine vapor generator is now passed into the reactor at a rate such as to maintain a partial pressure of iodine of from $10^{-2}$ to $10^{-4}$ mm. Hg.

In the above described manner, there is brought about a reaction yielding a vapor mixture $UI_4$ and $I_2$ existing in vapor phase and in equilibrium under the temperature and pressure conditions obtaining. The vapor mixture will have a composition predominating in $I_2$ and $UI_4$.

The vaporized mixture of $UI_4$ and $I_2$ thus formed is then passed through the condenser where it is subjected to a gradually decreasing temperature gradient varying from about 400° C. after it first enters the condensing zone to a temperature of the order of 200° to 250° C. near the far end of the condensing zone. Operating in this manner it is found that there is obtained a mass of black crystals that normally condense in the portion of the condenser nearest the outlet end of the reactor where the actual temperatures vary from about 350° to 400° C. These crystals are found to have a composition corresponding to uranium triiodide having the formula $UI_3$. Samples of uranium triiodide so obtained, when subjected to analysis for their I/U atomic ratios, have given values such as 2.99, 3.01 and 3.02, thus indicating substantial agreement between the actual analysis and the theoretical analysis required for pure uranium triiodide.

It is to be noted that the mechanism by which $UI_3$ is produced and ultimately recovered, as described above, is not primarily one involving fractional condensation of $UI_3$ from a vapor mixture of uranium iodides including $UI_3$ but is dependent upon bringing about a desirable shift in equilibrium for the reversible reaction.

$$UI_4 \rightleftarrows UI_3 + \tfrac{1}{2}I_2$$

As indicated previously, upon reacting iodine vapor with metallic uranium at a temperature of 500° to 530° C., the principal reaction is the formation of tetraiodide in vapor phase. As the resulting vapor mixture described above is passed through the condensing zone held within the temperature range of 315° to 390° C., the aforementioned equilibrium is shifted to the right thus promoting the formation of the triiodide, which under the temperature conditions prevailing condenses as relatively pure $UI_3$. It is to be pointed out that the formation of relatively pure $UI_3$ could not be effected in such manner except under the low partial vapor pressure of $I_2$ of approximately $10^{-2}$ to $10^{-4}$ which is maintained.

The uranium triiodide material as recovered from the fore part of the condenser in the manner described is eminently suited for use where relatively pure uranium triiodide is required, although if desired, it may be purified still further by an additional sublimation step.

While there has been described what is at present considered to be the preferred embodiment of my process, it will be understood that various modifications may be made therein and it is intended to cover all such modifications as fall within the scope of the appended claims.

What is claimed is:

1. A process for producing uranium triiodide comprising heating uranium metal to an elevated temperature of between 500° C. to 530° C., contacting said heated uranium metal with iodine vapor at a relatively low pressure to produce a vapor mixture predominating in $I_2$ and $UI_4$ and passing the vapor mixture through a condensing zone maintained at a partial pressure of iodine vapor of between $10^{-2}$ and $10^{-4}$ mm. Hg and having a temperature gradient decreasing from about 400° to about 200° C., whereby a shift in equilibrium of the reaction $UI_4 \rightleftarrows UI_3 + \frac{1}{2}I_2$ is effected to produce $UI_3$.

2. A process for producing uranium triiodide comprising heating uranium metal to an elevated temperature of between 500° C. to 530° C. at an absolute pressure of the order of $10^{-5}$ mm. Hg, contacting said heated uranium metal with iodine vapor to produce a mixture predominating in $I_2$ and $UI_4$ vapor and passing the vapor mixture so produced through a condensing zone maintained at a relatively low partial pressure of iodine of between $10^{-2}$ to $10^{-4}$ mm. Hg and having a temperature gradient falling from about 400° to about 200° C., whereby a shift in equilibrium of the reaction $UI_4 \rightleftarrows UI_3 + \frac{1}{2}I_2$ is effected to produce $UI_3$.

3. In a process for producing uranium triiodide, the steps comprising heating uranium metal to an elevated temperature, contacting the heated uranium metal with iodine vapor at a relatively low vapor pressure to form a vapor mixture of uranium tetraiodide and iodine and cooling said vapor mixture to a lower temperature while maintaining an iodine partial pressure of the order of $10^{-2}$ to $10^{-4}$ mm. Hg whereby a shift in the equilibrium of the reaction $$UI_4 = UI_3 + \frac{1}{2}I_2$$

is effected to produce $UI_3$.

JOHN A. HOLMES.

REFERENCES CITED

The following references are of record in the file of this patent:

Guichard; Comptes Rendues, volume 145, pages 807-8 and 921-2; (1907). Copy in Scientific Library.